(12) United States Patent
Walder et al.

(10) Patent No.: US 10,233,514 B2
(45) Date of Patent: Mar. 19, 2019

(54) METHOD OF MINERAL LEACHING

(71) Applicants: Ingar F. Walder, Vestbygd (NO); Richard Bialecki, London (GB)

(72) Inventors: Ingar F. Walder, Vestbygd (NO); Richard Bialecki, London (GB)

(73) Assignee: XELLIA PHARMACEUTICALS APS, Copenhagen S (DK)

( * ) Notice: Subject to any disclaimer, the term of this patent is extended or adjusted under 35 U.S.C. 154(b) by 334 days.

(21) Appl. No.: 14/433,952

(22) PCT Filed: Sep. 5, 2013

(86) PCT No.: PCT/EP2013/068351
§ 371 (c)(1),
(2) Date: Apr. 7, 2015

(87) PCT Pub. No.: WO2014/037433
PCT Pub. Date: Mar. 13, 2014

(65) Prior Publication Data
US 2015/0275328 A1  Oct. 1, 2015

(30) Foreign Application Priority Data

Sep. 5, 2012  (NO) .................................. 20120997

(51) Int. Cl.
C22B 4/00       (2006.01)
C22B 3/06       (2006.01)
C22B 3/18       (2006.01)

(52) U.S. Cl.
CPC .................. *C22B 4/00* (2013.01); *C22B 3/06* (2013.01); *C22B 3/18* (2013.01); *Y02P 10/234* (2015.11)

(58) Field of Classification Search
CPC ..... C22B 4/00; C22B 3/18; C22B 3/06; Y02P 10/234
(Continued)

(56) References Cited

U.S. PATENT DOCUMENTS 3,089,750 A * 5/1963 Samuelson ........... C22B 3/0005
                                                    204/558
3,266,889 A * 8/1966 Duncan ..................... C22B 3/18
                                                    423/27
(Continued)

FOREIGN PATENT DOCUMENTS

FR    2703701 A1 * 10/1994  ......... B23K 37/0443
GB    2421203 A    6/2006
(Continued)

OTHER PUBLICATIONS

Derwent English-language abstract of FR 2703701 A1.*
(Continued)

*Primary Examiner* — Nicholas A Smith
*Assistant Examiner* — Colleen M Raphael
(74) *Attorney, Agent, or Firm* — Cantor Colburn LLP

(57) ABSTRACT

A method of dissolution of minerals in acid is disclosed. The method comprises providing minerals to be leached in an aqueous solution,
supplying acid or an acid precursor to the aqueous solution, thereby forming a reaction mixture comprising acid;
supplying energy in the form of a combination of high-voltage electric pulses and ultrasound pulses to the reaction mixture to enhance dissolution of the minerals.

15 Claims, 2 Drawing Sheets

(58) Field of Classification Search
USPC ............ 299/5; 423/27, 68, 86, 98, 109, 131, 423/150.1, 658.5; 204/157.42, 157.62; 422/128, 20; 205/340
See application file for complete search history.

(56) References Cited

U.S. PATENT DOCUMENTS

| | | | | |
|---|---|---|---|---|
| 3,717,568 | A * | 2/1973 | Brown | C25C 1/12 204/229.5 |
| 4,039,404 | A * | 8/1977 | Richards | B01D 11/0419 205/581 |
| 4,168,295 | A * | 9/1979 | Sawyer | B01J 19/10 422/128 |
| 4,369,100 | A * | 1/1983 | Sawyer | B01J 19/10 204/157.42 |
| 5,332,559 | A * | 7/1994 | Brierley | C22B 3/18 423/27 |
| 8,470,269 | B2 * | 6/2013 | Chung | C22B 60/0234 210/748.01 |
| 8,475,747 | B1 * | 7/2013 | Johnson | B01D 9/00 252/625 |
| 2005/0260106 | A1 * | 11/2005 | Marhasin | B01J 19/10 422/128 |
| 2009/0305378 | A1 * | 12/2009 | Brent | B01D 53/62 435/168 |
| 2010/0025240 | A1 | 2/2010 | Muller-Siebert et al. | |
| 2011/0150729 | A1 * | 6/2011 | Liu | C22B 3/42 423/139 |
| 2013/0336858 | A1 * | 12/2013 | Aoki | C22B 1/005 423/68 |

FOREIGN PATENT DOCUMENTS

| | | |
|---|---|---|
| SU | 384905 A | 5/1973 |
| SU | 1538929 | 1/1990 |
| WO | 199710058 A1 | 3/1997 |
| WO | 199903588 A1 | 1/1999 |
| WO | 2008061305 A1 | 5/2008 |

OTHER PUBLICATIONS

Derwent abstract of RU2485193C1 to Javorovskii et al (Year: 2013).*
Andres et al.; "Liberation of Valuable Inclusions in Ores and Slags by Electrical Pulses"; Powder Technology; 114; pp. 40-50; (2001).
Chizhikov et al.; "Use of the Joint Action of Ultrasonic and Electric Fields to Improve Leaching of Metals"; Sbornik-Moskovskii Institut Stali i Splavov; 77; pp. 94-96; (1974) Abstract only.
Gerdemann, et al.; Ex Situ Aqueous Mineral Carbonation; Environ. Sci. Technol.; 41; pp. 2587-2593; (2007).
International Search Report and Written Opinion; International Application No. PCT/EP2013/068351; International Filing Date Sep. 5, 2013; dated Dec. 4, 2013; 10 pages.
Narayana et al.; "Leaching of Metals from Ores with Ultrasound"; Min. Pro. Ext. Met. Rev.; 16; pp. 239-259; (1997).
Priority Document No. 20120997; filed Sep. 5, 2012; Search Report; 2 pages.
Haug, Tove Anette; Dissolution and Carbonation of Mechanically Activated Olivine—Investigating $CO_2$ Sequestration Possibilities; PhD Thesis,; NTNU, pp. 1-242; (2010).
Korneliussen, A.; Lecture; presentation: "Possibilities for Use of $CO_2$ for Increased Added Value within Mineral Based Industry"; Bellona, Oslo; 24 pages; Mar. 3, 2011; Abstract in English prepared by Dorte Lajer, Onsagers AS 2015; 4 pages.
O'Connor, et al.; "Research Status on the Sequestration of Carbon Dioxide by Direct Aqueous Mineral Carbonation"; Proceedings, Session 35, 35-1, 18th Annl Int'l Pittsburgh Coal Conference, Newcastle, NSW, Australia, Dec. 3-7, 2001.
Wilson et al.; "Carbon Dioxide Fixation Within Mine Wastes of Ultramafic-Hosted Ore Deposits: Examples from the Clinton Creek and Cassiar Chrysotile Deposits, Canada"; Econ. Geol. 104; pp. 95-112; (2009).

* cited by examiner

METHOD OF MINERAL LEACHING

The present invention relates to a method of mineral leaching. Especially the present invention relates to a method for enhancing the leaching effect of carbonic acid involving silicate minerals and carbonate minerals, however, other minerals and leaching agents are also covered by this process method.

BACKGROUND

The need for mineral resources is increasing with the increasing population and the development especially in the large economies as India, China and Brazil. There is a large focus on discovering new mineral deposits and enhancing the exploitation of those that have already been discovered. New and/or improved extraction method can be essential in supplying the demand for the mineral resources. Processing the mineral resource not only exploiting it enhances the economic value of the mineral resource with as much as an order of magnitude or more. The presence of other natural resources in the proximity of the mineral resources as well as the geographic location can be of importance for instance for the feasibility of exploitation. As such it can be an advantage having natural gas locally available and mineral resources in proximity to the coast as it is the case in Northern Norway.

In the recent years a lot of development in different types of leaching techniques has taken place (acid leach, alkaline leaching, hydro-bio leaching etc.). Most of this research has focused on sulfides and oxides for metal extraction. There has also been a lot of research taking place on $CO_2$-mineral sequestration, which is also enhancing the understanding of mineral leaching.

Silicate minerals show a very large range of reaction rates, where olivine is one of the most reactive silicate minerals. The reaction rate of olivine is quite high, however, a common obstacle is that secondary minerals form on the surface of the olivine and inhibits a continuation of high reaction rate and to maintain high reaction rate high pressure and temperature is implied.

PRIOR ART

Mineral leaching has been used for many years as part of metal extraction. It is extensively used for extraction of copper and gold, but methods have been developed for many other metals as well (uranium, silver, tungsten, nickel etc.). The leaching may be based on acid as a agent to dissolve the minerals containing the metals and many times aided by bacteriological processes to enhance the reaction rates. Microbes are especially effective for sulphide ores, and a lot of development has been done over the last 10 years to improve the methods and enhance the reaction rate, and expand the climatic areas where this is feasible. Different ligands are also used in leaching techniques, where carbonate in alkaline solutions form complexes with uranium, and cyanide for gold and silver leaching and thereby enhance the solubility of the uranium, gold and silver.

Reaction rates for silicates have been studied for the last 40-50 years; however, less research has been performed on other minerals than sulphides and oxides for metal leaching. Over the last 10 years research as part of $CO_2$-mineral sequestration for leaching silicates to extracting/release calcium and magnesium for carbonate precipitation has become popular. This research is opening up for also developing methods to leach elements from these minerals to produce valuable products not only to perform $CO_2$ sequestration. With new technology and combining different industries it may be more feasible to extract valuable elements from the silicates and carbonates.

The release of $CO_2$ from combustion of fossil fuels and from industrial processes such as cement production, roasting of ores, and steel production has gained much interest in recent years due to the influence of $CO_2$ on the environment and effects such as global warming. Many of the sources of $CO_2$ such as emissions from power plants comprise only a few percent $CO_2$ and accordingly huge amounts of emissions have to be treated to separate the $CO_2$ formed during combustion. Much focus has been on methods for $CO_2$ capture using liquid absorbents. These processes, so far, have had a high energy demand and have resulted in a $CO_2$ stream for which permanent storage or reuse has to be secured in a secondary process. However, the increasing focus on $CO_2$ emission as a tradable commodity opens opportunities for utilizing the emission gases for mineral leaching not only for $CO_2$-mineral sequestration, but also for element extraction.

Low cost $CO_2$-mineral sequestration has thus far been found to be very energy consuming and expensive due to the need for high pressure and high temperature to have mineral reaction rates efficient for industrial processes.

The natural fixation of atmospheric $CO_2$ in mine wastes has been studied earlier with the focus to document the fixation with respect to the total carbon dioxide impact of the mining process. The natural occurring passive reaction between, atmospheric $CO_2$ and mine tailings may result in a reduction in the overall $CO_2$ impact of the mining (Wilson S. A. et al. in "Carbon Dioxide Fixation within Mine Wastes of Ultramafic-Hosted Ore Deposits: Examples from the Clinton Creek and Cassiar Chrysotile Deposits, Canada." Econ. Geol. v. 104, pp. 95-112 (2009)). The results of such a study are disclosed by natural fixation of $CO_2$ is also facilitated by silicate mineral weathering and carbonate precipitation, taking place in-situ in soils and rocks e.g. caliche, and ex-situ in oceans in soils e.g. limestone formations.

Investigations have also been carried out involving the mechanical activation by milling of rocks to increase the available surface area and, thereby, obtaining increased reaction between gas containing $CO_2$ and solid minerals. However the reactions rates have still been too slow for application in an industrial process (Haug, T. A., Dissolution and carbonation of mechanically activated olivine-Investigating $CO_2$ sequestration possibilities, PhD thesis, NTNU, 2010).

Leading researchers in the field concluded that ex-situ mineral carbonatisation is too expensive (high energy consumption) to be viable even though considerable mineral dissolution and carbonate precipitation was obtained within a few hours by use of olivine in some of their experiments (Gerdemann et al. "Ex Situ Aqueous Mineral Carbonation", Environ. Sci. Technol. 2007, 41, 2587-2593; O'Connor, W. K. et al., December 2001, "Research Status on the Sequestration of carbon dioxide by direct Aqueous Mineral Carbonation" Proceedings, Session 35, 35-1, 18th Annual International Pittsburgh Coal Conference, DOE/ARC-2002-001). Different type of pretreatment (ligands, preheating, mechanical activation by milling etc), was tried in high temperature high-pressure reaction chambers (O'Connor et al., 2001). Gerdemann et al. further evaluated dissolution rate of finely ground olivine and serpentine in a supercritical $CO_2$-water solution in a high temperature and pressure vessel, and converted 81% of the olivine to magnesium carbonate in a few hours and 92% of preheated serpentine in one hour also to magnesium carbonate.

Patent application WO2008/061305 A1 applies mineral sequestration using thermal pre-activation of silicates by heating to 500-800° C. Heating source is the power plant itself that is also the source of $CO_2$. This method is based on spraying carbonated water with or without ligands onto heaps. The carbonation is taking place within the silicate. NO20110872 discloses another method comprising injecting $CO_2$ at the bottom and water with or without ligands distributed from the top of a heap, and collecting the leachate at the bottom for further processing.

It is necessary as described above to dissolve (or alter with element release) minerals in order to achieve mineral $CO_2$ sequestration. Carbon dioxide is then used for precipitating carbonate minerals with released elements (Ca, Mg, Fe). When these minerals dissolve there may be elements released that can form economically valuable products e.g. calcite ($CaCO_3$), magnesite ($MgCO_3$), silica ($SiO_2$), nickel. Different rock types will have different potential both depending upon the reaction rate of the minerals and the chemistry of the minerals.

Olivine rich rocks (dunite) may be iron or magnesium rich with little or no calcium, but with potentially high concentrations of nickel. Pyroxenes and amphiboles rich rocks have lower reaction rate than olivine, but may have relatively high calcium content in addition to iron and magnesium. Anorthite rich rocks (anorthosite) have high calcium and aluminium content but little or no magnesium and iron.

NO20110872 mention that carbonic acid could be an effective leaching for actinolite.

Use of high voltage electric pulses has been shown to be capable of disintegrating rocks, primarily along the mineral grains (US2010/0025240).

Ultrasound, also a form of electric pulses, is used for surface cleaning of material, enhancing mineral reaction rates and can, in addition, be used for stirring.

Standard mineral processing is commonly based on crushing and grinding the material so that the valuable minerals can be extracted in relatively high grade. If the economic minerals are free milled this will commonly result in higher grade in the concentrate. However, grinding/milling is often the high cost of mineral exploitation and also to fine grained can reduce the recovery rate. Leaching is another way of processing, as described above.

OBJECTIVES OF THE INVENTION

The present invention is aimed at provide a process which results in increased extraction of minerals when utilizing acid leaching.

A further aim is to provide a process which effectively combines mineral extraction with $CO_2$ sequestration.

It is also an objective of the present invention to increase the energy efficiency of the leaching process and to lower the reaction time need for the leaching to take place.

A further aim is to provide a method that may increase the leaching efficiency also for microbe assisted leaching processes.

To reach the presented aims and objectives the present invention provides a method of dissolution of minerals in acid wherein the method comprises providing minerals to be leached in an aqueous solution, supplying acid or an acid precursor to the aqueous solution, thereby forming a reaction mixture comprising acid; supplying energy in the form of a combination of high-voltage electric pulses and ultrasound pulses to the reaction mixture to enhance dissolution of the minerals. Optionally the dissolved minerals are extracted from the mixture in a subsequent step. The term "acid" refers to any known inorganic or organic acid applicable for mineral leaching. In one aspect the acid is selected from the group comprising HCl, HF, HBr, $HNO_3$, $H_2SO_4$, $H_2CO_3$, $H_2SO_3$, $H_3PO_4$, and $HClO_4$ or mixtures thereof.

The term "acid precursor" as used here refers to compounds which form an acid when brought in contact with and dissolved in the aqueous solution. Examples of such precursors include but are not limited to $CO_2$.

The term "minerals" as used here refers to mineral deposits that optionally have been graded to reduce the particle size and increase the surface area. Any pretreatment of the minerals prior to the acid leaching may be freely selected and performed according to existing, ordinary pretreatment procedures.

In one aspect of the present invention the minerals are silicates.

In another aspect of the method the acid is carbonic acid. In this aspect the carbonic acid by formed by supplying $CO_2$ gas as the acid precursor to the aqueous solution, thereby forming a reaction mixture comprising carbonic acid.

The $CO_2$ gas may in a further aspect originate from combustion of fossil fuel, cement production, steel production or roasting of ores.

In a special aspect of the present invention the purity of the supplied $CO_2$ gas is from 80 to 100 volume %.

In a further aspect of the method according to the present invention the ultrasound pulses are supplied at a frequency of 10-50 kHz, preferably at 20 kHz. In an embodiment of this aspect between 400-1100 kJ ultrasound energy per kg solids per minute is supplied.

According to another aspect the high-voltage pulses are supplied at a frequency of 0.05-5 Hz, preferably at 0.1-0.2 Hz. In an embodiment of this aspect the high-voltage pulses are supplied in intervals of 5 seconds. In a further aspect between 200-400 kJ high voltage energy per kg of solids per minute is supplied.

In another aspect of the present invention the mineral contains sulphide ores and the leaching process further comprises use of microbes. The activity of the microbes such as bacteria may if a further aspect be increased by the presence of $CO_2$.

BRIEF DESCRIPTION OF THE DRAWINGS

The present invention will be described in further detail we reference to the enclosed figures, wherein FIG. 1 schematically illustrates the leaching of olivine in carbonic acid under influence of ultra sound.

PRINCIPAL DESCRIPTION OF THE INVENTION

The present invention provides a method which improves the efficiency of mineral leaching with a acidic leaching agent. In a preferred embodiment the leaching agent is carbonic acid.

The present invention involves the use of two types of electric pulses to activate the surfaces of the grains for the leaching which again enhances the leaching rate in order to get valuable products from the leaching.

The two types of electric pulse technologies that are utilized in this invention are:
Ultrasound (E-Pulse US)
Discharge of high voltage in milliseconds (E-Pulse HV)

Ultrasound is cyclic sound pressure with a frequency greater than the upper limit of human hearing. For industrial purposes it is being used in cleaning surfaces (lenses, jewelries, surgical instruments, dental instruments etc.). It is also used for disintegration of organic cells e.g. bacteria and can be effective in cleaning sewer water for bacteria. Ultrasound can be applied continuously or in pulses, where the latter is used in this invention.

Figure 1:
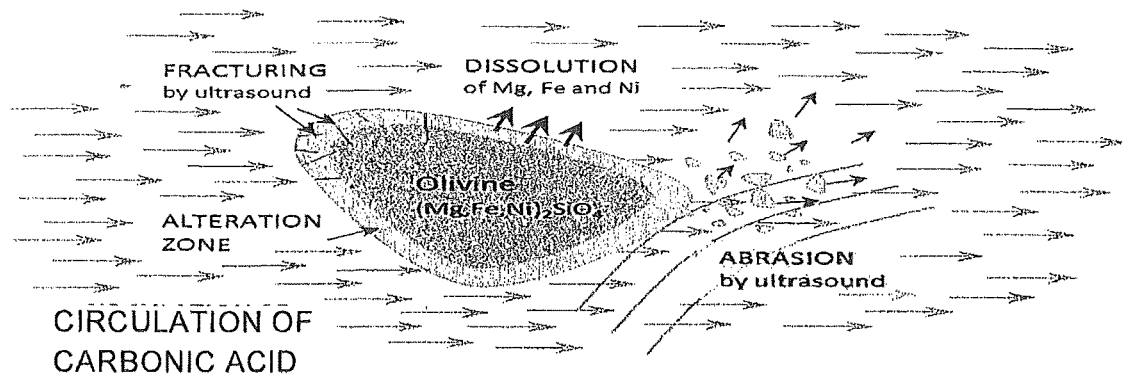

FIG. 1 illustrates schematically the leaching process of olivine in carbonic acid. During the leaching an alteration zone of secondary minerals will form on the outer surface of the olivine particle. The alteration zone slows down the leaching process as the alteration results in at least a partial passivation. Supplying ultrasound pulses to the leaching mixture results in abrasion especially of the alteration zone, and reduces the precipitation of secondary minerals on the surface of the reacting minerals. Further the ultrasound pulses result in fracturing of the alteration zone and possibly the fractures reach into the non-altered mineral and increases the surface area available for reactions. Additionally the ultrasound pulses provide stirring and circulation of the leaching solution. Stirring may be necessary to be able to keep the minerals available for the leaching agent. In the present invention the ultrasound can be used both as a stirrer and for increasing the available surface area for mineral reactions.

The E-Pulse HV gives high energy input onto the rock particles at pulses which results in defragmentation of the particles based their weakest bonds. The weakest bonds in a rock are commonly at the grain boundaries, but it may also be at cleavage planes, depending upon the rock particle see US2010/0025240 or WO97/10058.

Some silicate minerals (olivine, pyroxcene, anorthite) have a high initial dissolution rate, however, this slows down quickly, possibly due to silica precipitation (together with clay-mineral formation) on the surface of the mineral grains. High voltage electric pulses can defragment a rock along mineral grains (US2010/0025240), resulting in electric pulse pulverization. According to the present invention lower intensive energy (ultra sound or lower intensity of the high voltage electric pulse) is able to maintain mineral surfaces free of secondary precipitation resulting in maintaining high mineral reactivity.

Figure 2:
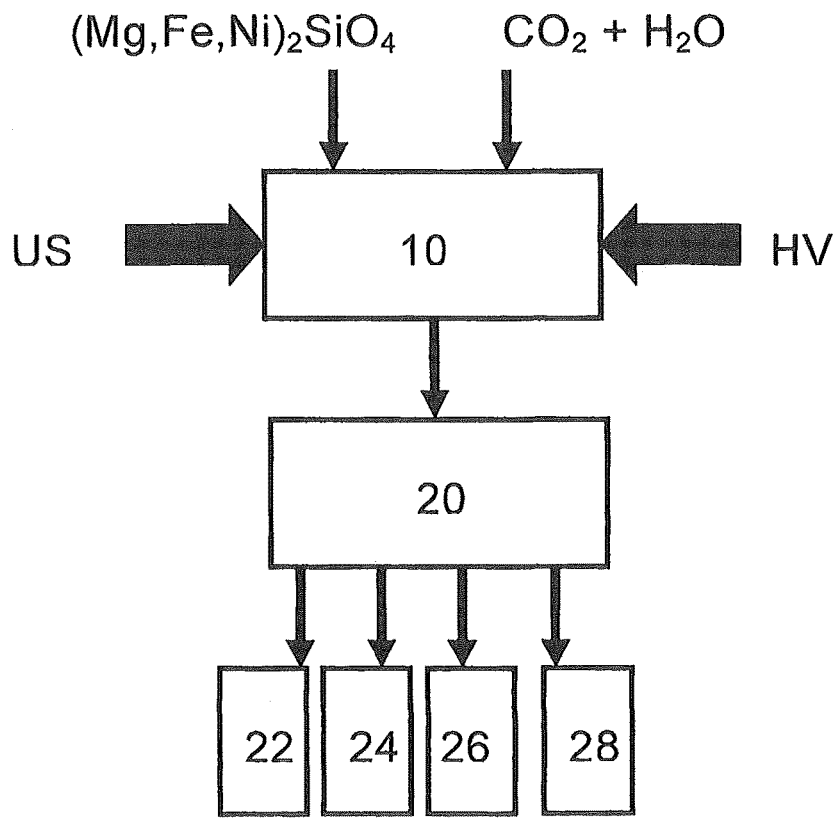
FIG. 2 shows a flow chart for an embodiment of the present invention.

FIG. 2 is a schematic overview of an embodiment of the present invention employed to leach olivine. Olivine ((Mg,Fe,Ni)$_2$SiO$_4$) carbon dioxide and water are added to a reaction chamber 10 where the mixture is subject to pulses of ultrasound (US) and high voltage energy pulses (HV). The process is a bulk process with integrated pulverization and dissolution. After an applicable retention and/or reaction time the leaching mixture containing all reaction products, such as a mixture of carbonate, SiO$_2$, etc. is transferred to a separation section 20. Here the different products are separated by conventional separation techniques, including mechanical, chemical and electrical techniques. In the illustrated embodiment 4 product fractions are obtained, 22 magnesite (MgCO$_3$), 24 Silica (SiO$_2$), 26 nickel (Ni), and 28 ferrihydrite (Fe(OH)$_3$).

Figure 3:
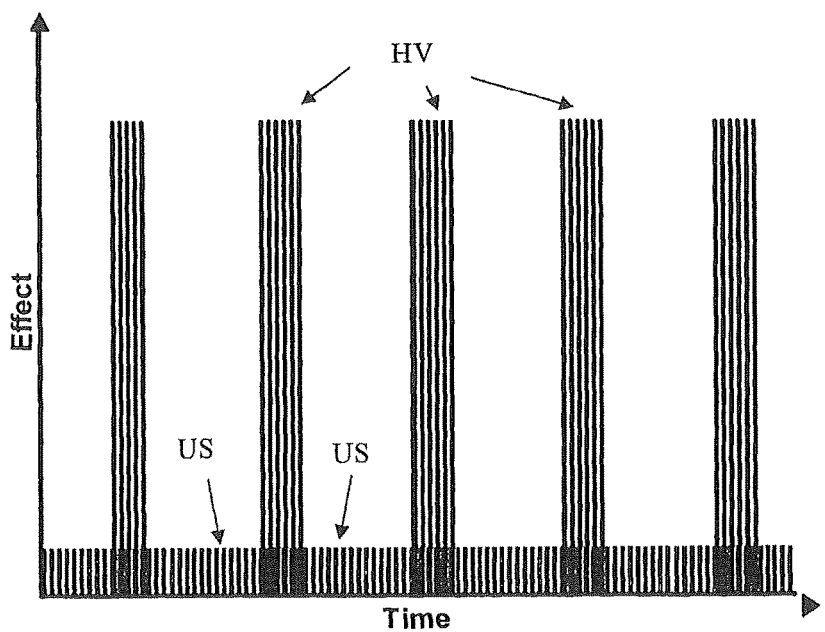
FIG. 3 illustrates graphically the electric effect supplied by ultra sound (US) and high voltage (HV) pulses as a function of time.

The energy of the single ultrasound pulse is much less than the single E-Pulse HV pulse delivered to the mineral sample, however, the US pulses are more frequent than the E-Pulse HV pulses. FIG. 3 is provided to illustrate this, however it should be noted that this figure is not to scale. The ultrasound (US) pulses are generally applied at a frequency from 10 to 100 kHz, in one embodiment from 15 to 50 kHz, or in another embodiment at 15-25 kHz and preferably at around 20 kHz. The amplitude of the US may in one embodiment be between 21-145 μm and a power of 400 watt. The ultrasound pulses applicable for this purpose have a power of from 0.2 to 10 kW, in another embodiment between 0.3 and 5 kW, more preferably between 0.4 and 2.5 kW.

The energy of each of the high voltage (HV) E-pulses is generally considerably higher than the effect of each US-pulse, often from 10 to 1000 times higher. The energy supplied by the high voltage pulses is between 100 J and 3000 J, preferably 2000 J range more preferably 3000 J. The pulsing regime may in one embodiment consist of pulse sequence of 20 pulses (E-Pulse HV) delivered during 5-100 seconds, preferably 10-50 seconds at a frequency of 0.1-0.2 Hz and then an interval/break of 10 to 120 seconds, preferably from 20 to 60 seconds before the pulse sequence is repeated.

There are several geochemical processes going on in the process. First of all, continuously bobbling 100% CO$_2$ gas into the leachate results in water becoming saturated in dissolved CO$_2$. Dissolved CO$_2$ forms carbonic acid according to the following reaction (Eq. 1):

$$CO_2(g)+H_2O \rightarrow H_2CO_3 \qquad (Eq. 1)$$

The introduction of acid and carbonate in the leachate increases the solubility/reaction rate of olivine and the following reaction may take place.

$$Fe_{0.4}Mg_{1.6}SiO_4+4H^+ \rightarrow 0.4Fe^{2+}+1.6Mg^{2+}+H_4SiO_4(aq) \qquad (Eq. 2)$$

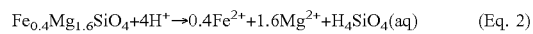

Elements substituting for iron and magnesium in the silicates will also be released as iron and magnesium are released. These elements can be removed from the solution by different processing methods (e.g. solvent-extraction electro-winning for copper and nickel). Iron occurs as ferrous iron in the silicate minerals will be oxidized to ferric iron and precipitate as iron-hydroxide according to the following reaction (Eq 3):

$$2Fe^{2+}+5H_2O+\tfrac{1}{2}O_2 \rightarrow 2Fe(OH)_3+4H^+ \qquad (Eq. 3)$$

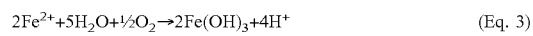

This iron oxidation is relatively slow with a half-life of 2-3 days depending on the oxidizing conditions. The precipitation of ferrihydrite is pH dependent and with a pH lower than approximately 3, there will be little precipitation, while at pH 5 there will be little or no iron in solution.

Serpentine, as a secondary mineral, has been observed on surfaces of the olivine (in a reaction rim). This may be formed as an incongruently from olivine according to the following reaction (Eq. 4).

$$10Fe_{0.2}Mg_{1.8}SiO_4+\tfrac{1}{2}O_2+12H^++9H_2O \rightarrow 2Fe(OH)_3+$$
$$4Mg_3Si_2O_5(OH)_4+6Mg^{2+}+2H_4SiO_4(aq) \qquad (Eq. 4)$$

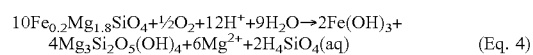

Olivine+oxygen+water+acid ferrihydrite+dissolved iron+serpentine+dissolved magnesium+siliceous acid

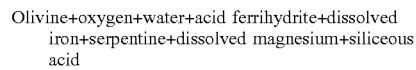

The CO$_2$ saturation will result in a pH of approximately 4.0-4.2. Silicate-mineral dissolution can drive the pH to 9-10 depending on how effective the input of carbonic acid is and the reaction rate of the silicate minerals and the type of secondary mineral reactions. Rapid reaction rate will result in saturation of silica and precipitation of hydrous silica. This hydrous silica can also form the basis for a clean product e.g. used in the high strength cement.

The leaching of olivine has been used here as an example of a mineral applicable for the process, however a person skilled in the art will appreciate that a large number of single minerals and combination of minerals can be effectively dissolved by the present method.

Calcite easily dissolves is acid and a clean product can be produced by dissolving high-grade limestone and selectively precipitate calcium carbonate. Calcite dissolves also easily in carbonic acid. This dissolution process is also strongly affected by use of ultrasound. Calcite can be selectively dissolved from dolomite and graphite impurities in limestone enhanced by use of ultrasound. High-grade calcium leachate will then form the basis for calcium carbonate precipitation by raising the pH.

Figure 4:
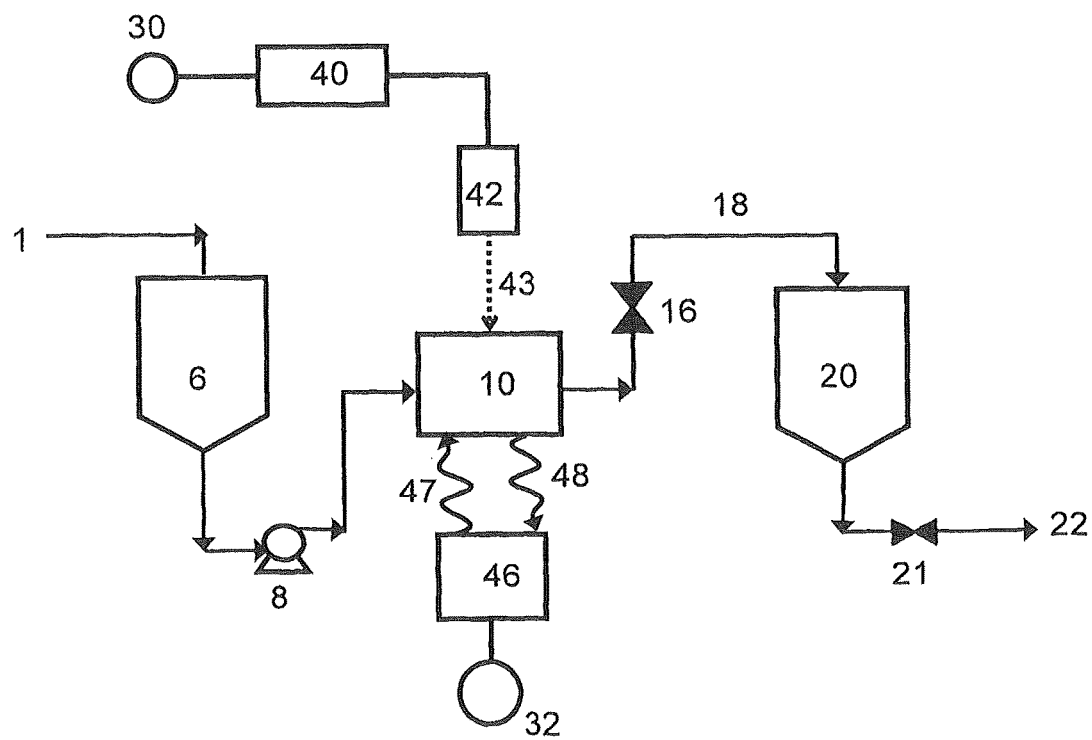
FIG. 4 illustrates an embodiment of a system adapted to perform the present invention.

FIG. 4 shows a possible configuration of a system for performing the present invention. A mixture of the mineral to be leached, water, $CO_2$ and any other additives ligands or salts are added as stream 1 to a tank 6. For simplicity the different components are added as one stream through one inlet, but it is equally applicable to supply the components through separate inlets. A stirring device may be included in the tank 6 to keep the mixture homogenised. A pump 8 transports the mixture into a reaction chamber 10 which may be configured as a flow cell. An ultrasonic generator 40 is supplied with power from the power unit 30. The ultrasonic generator is connected to an ultrasonic transducer 42, which supplies US-pulses to the reaction mixture present in the reaction chamber 10. A power unit 32 supplies electric energy to a high voltage pulse generator 46. The generator 46 is electrically connected to two electrodes arranged with in the reaction chamber through the wires 47 and 48. The electrodes are supplied with high voltage electricity from the generator 46 in applicable pulse intervals. The configuration of the electrodes with in the reaction chamber is not disclosed in detail, but these are well known to a person skilled in the art and art discussed for instance in US2010/0025240 and WO97/10058.

After the reaction mixture has been subject to HV and US energy pulses according to the present invention the mixture is via valve 16 and pipeline 18 introduced into a second tank 20 from where the reacted mixture may proceed through valve 21 as reacted mixture 22 to further downstream separation steps. The valve 16 and the pump 8 control the pressure within the reaction chamber. If the pressure is to lower the dissolved $CO_2$ could be released from the liquid phase which could result in increased pH with the reaction chamber.

Sulphide mineral leaching is becoming more and more important as the basis for extracting metals such as gold, silver, nickel, copper, zinc, and lead. The leaching process is taking place either in large leach dumps or in enclosed reaction vessels. The sulphide dissolution is primarily based on sulphuric acid leaching enhanced by microbes.

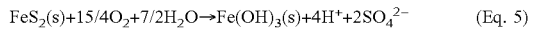

$$FeS_2(s)+15/4O_2+7/2H_2O \rightarrow Fe(OH)_3(s)+4H^++2SO_4^{2-} \qquad (Eq. 5)$$

pH, microbes, iron content, temperature, available surface, oxygen availability, and other elements in the leachate control these reactions. The sulphide leaching can be combined with supplying $CO_2$ as discussed above, thereby a synergy effect is obtained as the acidity influences the leaching and the presence of $CO_2$ additionally has a positive influence on the microbiological processes.

EXAMPLES

Several experiments have been performed with E-pulse US (Branson Sonifier ultrasonic cell disruptor—ANALOG UNITS Models S-450A) and E-Pulse HV (designed by Dr. Richard Bialecki). Crushed dunite with +95% olivine was used in grain sizes of less than 63 mesh, 63-250 mesh, 250-500 mesh and +500 mesh. About 20 grams testing material was used. The frequency used for E-pulse US was 20 kHz. The E-Pulse HV converted 230 volts to 3-5000 volts with discharge frequency 100-200 kHz. Duration of the E-Pulse US was approximately 20-30 minutes, while the E-Pulse HV was 20 pulses of 5 seconds with 10 seconds between the pulses. $CO_2$ was bobbling through the reaction vessel continuously during the experiments.

Analyzing the leachate from the experiments, secondary mineral precipitates, and mineralogical changes by sequential chemical extraction checked results of the leaching experiments. The pH of the reaction vessel with 1 liter de-ionized water, only with constant flow of $CO_2$ in water was 4.0-4.2, with the 20 gram samples pH increased to 4.4-4-6, while pH increased to 5.0-5.4 when E-pulse was applied. Temperature increased with 15° C. using the ultrasound, while E-pulse HV did not effect the temperature of the leachate.

Magnesium in the leachate increased from below detection limit (approximately 0.2 mg/l) to 30-40 mg/l in the most effective reaction experiments. Iron content also increased drastically from below detection limit to at the most 20 mg/l. Iron hydroxide precipitation took place in most of the experiments with E-Pulse. Secondary white mineral precipitate where observed during the experiments identified by XRPD/SEM as likely silica.

Similar experiments with shorter duration using E-Pulse US have also been performed on limestone also giving an effective dissolution of calcite compared to only bobbling $CO_2$ into the reaction vessel.

The invention claimed is:

1. A method of dissolution of minerals in acid comprising providing minerals to be leached in an aqueous solution, supplying an acid or an acid precursor to the aqueous solution, thereby forming a reaction mixture comprising the acid; and supplying energy in the form of a combination of electric pulses of 1000-5000V and ultrasound to the reaction mixture to enhance dissolution of the minerals.

2. The method of claim 1, wherein the minerals are silicates.

3. The method of claim 1, wherein the acid is carbonic acid.

4. The method of claim 3, wherein the method comprises supplying $CO_2$ gas as the acid precursor to the aqueous solution, thereby forming a reaction mixture comprising carbonic acid.

5. The method of claim 4, wherein the $CO_2$ gas originates from combustion of fossil fuel, cement production, steel production or roasting of ores.

6. The method of claim 5, wherein the purity of the supplied $CO_2$ gas is from 80 to 100 volume %.

7. The method of claim 1, wherein the ultrasound pulses are supplied at a frequency of 10-50 kHz.

8. The method of claim 1, wherein the electric pulses are supplied at a frequency of 0.05-5 Hz.

9. The method of claim 8, wherein the electric pulses are supplied with a frequency of 0.1-0.2 Hz.

10. The method of claim 1, wherein between 400-1100 kJ ultrasound energy per kg solids per minute is supplied.

11. The method of claim 1, wherein between 200-400 kJ high voltage energy per kg solids per minute is supplied.

12. The method of claim 1, wherein in a subsequent step the dissolved minerals are extracted from the mixture.

13. The method of claim 1, wherein the mineral contains sulphide ores and the leaching process further comprises use of microbes.

14. The method of claim 1, wherein the electric pulses are applied in intervals of 5-100 seconds with interval breaks lasting 10-120 seconds.

15. The method of claim 1, wherein the method is performed at room temperature.

\* \* \* \* \*

UNITED STATES PATENT AND TRADEMARK OFFICE
CERTIFICATE OF CORRECTION

PATENT NO. : 10,233,514 B2  
APPLICATION NO. : 14/433952  
DATED : March 19, 2019  
INVENTOR(S) : Walder et al.

Page 1 of 1

It is certified that error appears in the above-identified patent and that said Letters Patent is hereby corrected as shown below:

On the Title Page

Please delete item (73) to remove Assignee information.

Signed and Sealed this  
Fourteenth Day of May, 2019

Andrei Iancu  
*Director of the United States Patent and Trademark Office*